(12) United States Patent
Azizi et al.

(10) Patent No.: US 9,288,291 B2
(45) Date of Patent: *Mar. 15, 2016

(54) METHOD AND APPARATUS FOR A 1 MHZ LONG TRAINING FIELD DESIGN

(71) Applicant: INTEL CORPORATION

(72) Inventors: Shahrnaz Azizi, Cupertino, CA (US);
Thomas Kenney, Portland, OR (US);
Eldad Perahia, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,548

(22) Filed: Apr. 24, 2014

(65) Prior Publication Data
US 2014/0233589 A1    Aug. 21, 2014

Related U.S. Application Data

(63) Continuation of application No. 13/532,056, filed on Jun. 25, 2012, now Pat. No. 8,750,215.

(60) Provisional application No. 61/607,179, filed on Mar. 6, 2012.

(51) Int. Cl.
*H04W 4/00* (2009.01)
*H04L 29/06* (2006.01)
*H04L 27/26* (2006.01)
*H04L 12/70* (2013.01)

(52) U.S. Cl.
CPC ............ *H04L 69/22* (2013.01); *H04L 27/2613* (2013.01); *H04L 27/2666* (2013.01); *H04L 2012/5652* (2013.01)

(58) Field of Classification Search
None
See application file for complete search history.

(56) References Cited

U.S. PATENT DOCUMENTS 8,750,215 B2 *   6/2014   Azizi et al. ................ 370/328
2008/0043671 A1   2/2008   Moon et al.
(Continued)

FOREIGN PATENT DOCUMENTS

WO    2013/134143 A1    9/2013

OTHER PUBLICATIONS

International Search Report and Written Opinion received for PCT Patent Application No. PCT/US2013/028905, mailed on Jun. 14, 2013, 10 pages.

(Continued)

*Primary Examiner* — Anh-Vu Ly
(74) *Attorney, Agent, or Firm* — Ellis B. Ramirez; Prass LLP

(57) ABSTRACT

An approach is provided for defining a 1 MHz preamble of a packet. The approach involves determining a preamble sequence of a packet, the preamble sequence having a determinable length. The approach also involves causing, at least in part, the preamble sequence to be divided into a predetermined number of blocks. The approach further involves causing, at least in part, a mathematical operation and a summation over the predetermined number of blocks and a corresponding number of received blocks. The approach also involves causing, at least in part, the summation to be maximized to determine the preamble sequence corresponds to one of a first bandwidth or a second bandwidth, the second bandwidth being greater than the first bandwidth, to determine a type of the packet.

20 Claims, 3 Drawing Sheets

(56) References Cited

U.S. PATENT DOCUMENTS

| | | |
|---|---|---|
| 2010/0046656 A1 | 2/2010 | van Nee et al. |
| 2012/0236971 A1* | 9/2012 | Taghavi Nasrabadi et al. ............................ 375/340 |
| 2012/0269069 A1* | 10/2012 | Porat et al. .................... 370/241 |
| 2012/0269124 A1 | 10/2012 | Porat |
| 2012/0269125 A1 | 10/2012 | Porat et al. |
| 2012/0327870 A1 | 12/2012 | Grandhi et al. |
| 2013/0016642 A1 | 1/2013 | Banerjea et al. |
| 2013/0051260 A1 | 2/2013 | Liu |
| 2013/0107830 A1 | 5/2013 | Jones et al. |
| 2013/0107981 A1 | 5/2013 | Sampath et al. |
| 2013/0128806 A1 | 5/2013 | Vermani et al. |
| 2013/0142276 A1 | 6/2013 | Baik et al. |
| 2013/0155976 A1 | 6/2013 | Chen et al. |
| 2013/0176998 A1 | 7/2013 | Choudhury et al. |
| 2013/0177090 A1 | 7/2013 | Yang et al. |
| 2013/0182662 A1* | 7/2013 | Zhang et al. .................. 370/329 |
| 2013/0235860 A1* | 9/2013 | Vermani et al. ............... 370/338 |
| 2013/0243115 A1 | 9/2013 | Taghavi Nasrabadi et al. |
| 2013/0343478 A1* | 12/2013 | Yang et al. .......... H04L 27/2618 375/295 |

OTHER PUBLICATIONS

Porat et al., "32FFT STF/LTF Sequences", IEEE 802.11-12/0115r0, see slides 6, 10, Jan. 16, 2012, pp. 11-12.

Vermani etal., "Preamble Format for 1 MHz", IEEE 802.11-11/1482r2, see slides 7, 8, 10, Nov. 7, 2011.

Bo et al. "PLCP Preamble Design", IEEE 802./1502r0 see slide 4, Nov. 7, 2011.

* cited by examiner

100

METHOD AND APPARATUS FOR A 1 MHZ LONG TRAINING FIELD DESIGN

This application claims priority to U.S. Provisional Application No. 61/607,179 filed on Mar. 6, 2012 and U.S. patent application Ser. No. 13/532,056 filed on Jun. 25, 2012, the contents of which are herein incorporated by reference.

BACKGROUND

Service providers and device manufacturers (e.g., wireless, cellular, etc.) are continually challenged to deliver value and convenience to consumers by, for example, providing compelling network services. IEEE 802.11 (e.g., the IEEE 802.11 standard, IEEE std. 802.11-2012, published Mar. 29, 2012) is a set of standards for implementing wireless local area network communication in various frequency bands (e.g. WiFi). The 802.11 standard comprises a series of modulation techniques that use a same basic protocol, but is broken up into a family of bandwidths having various transmission rates. For example, in .11a/g, 20 MHz channel widths are defined, in .11n 40 MHz channel widths are defined, and in .11ac both 80 and 160 MHz.

The evolution of WiFi has historically been to increase data rate. But, the newly developed .11ah actually targets comparatively lower rate services. In 802.11ah, a very low data rate operation is being enabled. In .11ah, the bandwidths defined are 1 MHz, and a set of down-clocked .11ac bandwidths, namely 2, 4, 8 and 16 MHz, where the down clocking is 10× are also defined. The 1 MHz rate is not derived from the .11n/ac rates, and thus this bandwidth mode is designed more or less independently. For its independent development, a 1 MHz system is likely to use a 32 point Fast Fourier Transform (FFT), as opposed to the minimum of 64 called for in .11ac.

Data packets corresponding to frequency bands are typically transmitted having a preamble portion. With the adoption of a 1 MHz bandwidth having a 32 point FFT, a new preamble structure needs to be designed. In developing the preamble, one of the main considerations is coexistence and detection of the other bandwidths of operation, for example with the 2, 4, 8 and 16 MHz bands discussed above. In a transmission, any of those bandwidths are possible and a receiver needs a mechanism in order to determine the type of packet during the preamble portion of the packet.

SOME EXAMPLE EMBODIMENTS

Therefore, there is a need for an approach for determining a packet type based on a preamble portion of the packet while achieving orthogonality among various sequences of the packet.

According to one embodiment, a method comprises determining a preamble sequence of a packet, the preamble sequence having a determinable length. The method also comprises causing, at least in part, the preamble sequence to be divided into a predetermined number of blocks. The method further comprises causing, at least in part, a mathematical operation and a summation over the predetermined number of blocks and a corresponding number of received blocks. The method also comprises causing, at least in part, the summation to be maximized to determine the preamble sequence corresponds to one of a first bandwidth or a second bandwidth, the second bandwidth being greater than the first bandwidth, to determine a type of the packet.

According to another embodiment, an apparatus comprises at least one processor, and at least one memory including computer program code for one or more computer programs, the at least one memory and the computer program code configured to, with the at least one processor, cause, at least in part, the apparatus to determine a preamble sequence of a packet, the preamble sequence having a determinable length. The apparatus is also caused to cause, at least in part, the preamble sequence to be divided into a predetermined number of blocks. The apparatus is further caused to cause, at least in part, a mathematical operation and a summation over the predetermined number of blocks and a corresponding number of received blocks. The apparatus is also caused to cause, at least in part, the summation to be maximized to determine the preamble sequence corresponds to one of a first bandwidth or a second bandwidth, the second bandwidth being greater than the first bandwidth, to determine a type of the packet.

According to another embodiment, a computer-readable storage medium carrying one or more sequences of one or more instructions which, when executed by one or more processors, cause an apparatus to determine a preamble sequence of a packet, the preamble sequence having a determinable length. The apparatus is also caused to cause, at least in part, the preamble sequence to be divided into a predetermined number of blocks. The apparatus is further caused to cause, at least in part, a mathematical operation and a summation over the predetermined number of blocks and a corresponding number of received blocks. The apparatus is also caused to cause, at least in part, the summation to be maximized to determine the preamble sequence corresponds to one of a first bandwidth or a second bandwidth, the second bandwidth being greater than the first bandwidth, to determine a type of the packet.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments are illustrated by way of example, and not by way of limitation, in the figures of the accompanying drawings.

DESCRIPTION OF SOME EMBODIMENTS

Examples of a method, apparatus, and computer program for determining a packet type based on a preamble portion of the packet while achieving orthogonality among various sequences of the packet are disclosed. In the following description, for the purposes of explanation, numerous specific details are set forth in order to provide a thorough understanding of the embodiments. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

Figure 1:
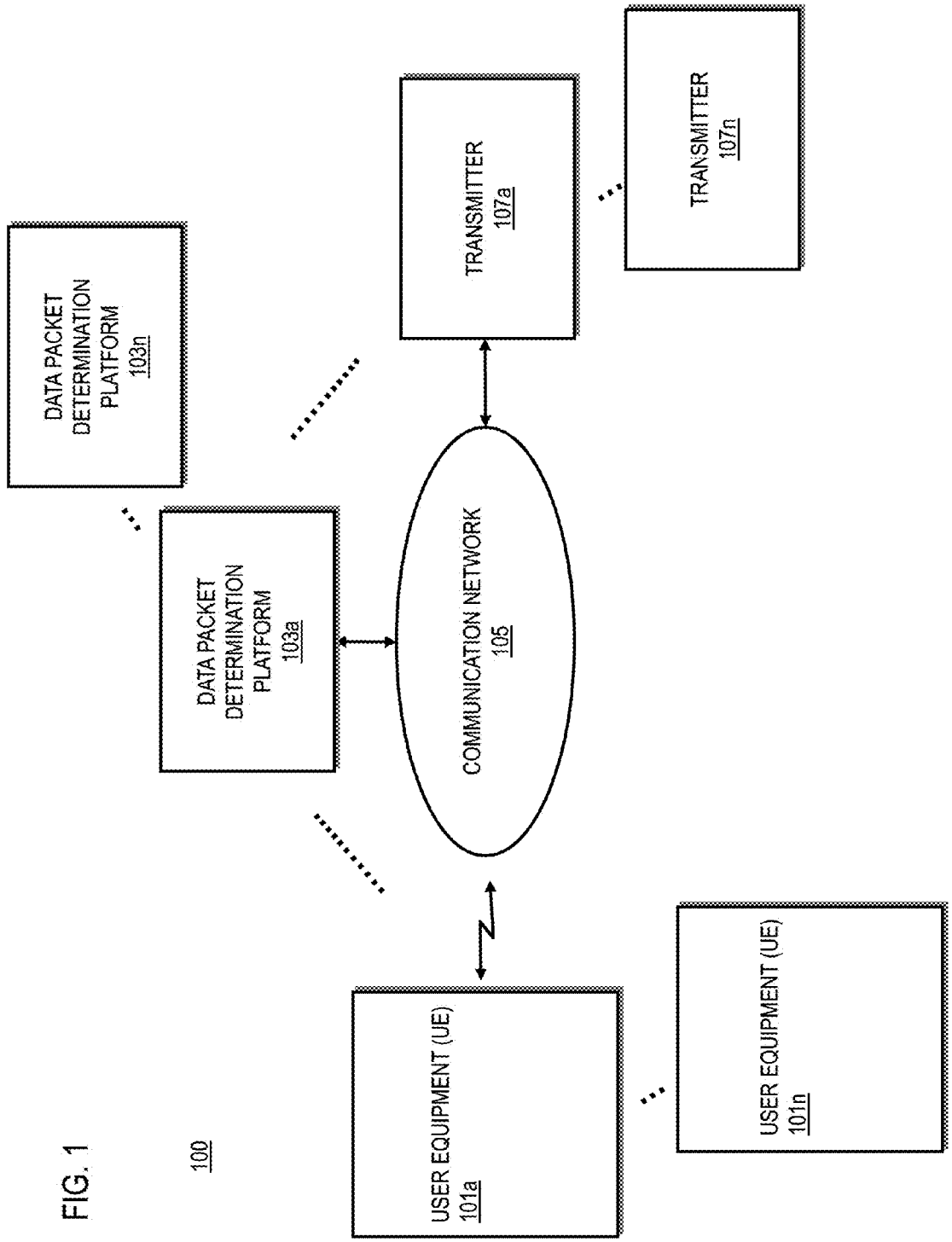
FIG. 1 is a diagram of a system capable of determining a packet type based on a preamble portion of the packet while achieving orthogonality among various sequences of the packet, according to one embodiment.

FIG. 1 is a diagram of a system capable of determining a packet type based on a preamble portion of the packet while achieving orthogonality among various sequences of the packet, according to one embodiment. IEEE 802.11 is a set of standards for implementing wireless local area network communication in various frequency bands (e.g. WiFi). The 802.11 standard comprises a series of modulation techniques that use a same basic protocol. For example, in .11a/g, 20 MHz channel widths are defined, in .11n 40 MHz channel widths are defined, and in .11ac both 80 and 160 MHz.

The evolution of WiFi has historically been to increase data rate. But, the newly developed .11ah actually targets comparatively lower rate services. In 802.11ah, a very low data rate operation is being enabled. In .11ah, the bandwidths defined are 1 MHz, and a set of down-clocked .11ac bandwidth, namely 2, 4, 8 and 16 MHz, where the down clocking is 10× are also defined. The 1 MHz rate is not derived from the .11n/ac rates, and thus this bandwidth mode is designed more or less independently. For its independent development, a 1 MHz system is likely to use a 32 point Fast Fourier Transform (FFT), as opposed to the minimum of 64 called for in .11ac.

As will be discussed in more detail below, packets corresponding to frequency bands are typically transmitted having a preamble portion. With the adoption of a 1 MHz bandwidth having a 32 point FFT, a new preamble structure needs to be designed. In developing the preamble, one of the main considerations is coexistence and detection of the other bandwidths of operation, for example with the 2, 4, 8 and 16 MHz bands discussed above. In a transmission, any of those bandwidths are possible and the receiver needs a mechanism in order to determine the type of packet during the preamble portion of the packet.

There are two different approaches for meeting this objective. The first is to create a signal that best meets a detection criteria and keeps the 2, 4, 8 and 16 MHz preamble unchanged from that of .11ac. The second is to define new preamble sequences for all bandwidths. It is highly desirable, however, for the 2, 4, 8 and 16 MHz preamble to remain unchanged from that of .11ac to minimize a design's complexity. Accordingly, the system described uses a 1 MHz preamble having zero cross correlation with a 2, 4, 8 and 16 MHz long training field (LTF) portion of the preamble.

Some proposals for .11ah that define a new preamble for all bandwidths (e.g., 1, 2, 4, 8 and 16 MHz), or keep the 2, 4, 8 and 16 MHz bandwidth preambles unchanged while defining a new 1 MHz preamble, fail to achieve orthogonality with the sequences.

To address this problem, a system 100 of FIG. 1 introduces the capability to determine a packet type based on a preamble portion of the packet while maintaining orthogonality among various sequences of the packet. The approach discussed below keeps the 2, 4, 8 and 16 MHz preambles intact from that of the .11ac standard, and defines a 1 MHz approach and sequence that achieves orthogonality and has a low peak to average power ratio. Minimizing the peak-to-average power ratio minimizes current consumption and reduces overall design costs.

As shown in FIG. 1, the system 100 comprises one or more user equipment (UE) 101*a*-101*n* (collectively referred to as UE 101) having connectivity to one or more a packet determination platforms 103*a*-103*n* (collectively referred to as packet determination platform 103) and one or more transmitters 107*a*-107*n* via a communication network 105. In some embodiments, the packet determination platform 103 may be a standalone component of the system 100, or it may be integrated into any of the UE 101 and/or the transmitter 107.

By way of example, though discussed above as a solution primarily for determining a packet type associated with 802.11ah communication standards, the communication network 105 of system 100 may include any of one or more networks such as a wired data network, a wireless network, a telephony network, or any combination thereof, and the system 100 may be applicable to determine a packet type regardless of a particular communication standard or band. As such, it is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The UE 101, according to various embodiments, is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, any of the UE 101's may communicate with one another or a transmitter 107 and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

As discussed above, communications between the network nodes are typically effected by exchanging discrete packets of data. Each packet typically comprises (1) preamble information associated with a particular protocol, (2) header information associated with a particular protocol, and (3) payload information that follows the header information and contains information that may be processed independently of that particular protocol. In some protocols, the packet includes (4)

trailer information following the payload and indicating the end of the payload information. The preamble includes information indicating, or has information that may be derived to indicate, the type of packet and protocol. The header includes information such as the source of the packet, its destination, the length of the payload, and other properties used by the protocol. Often, the data in the payload for the particular protocol includes a preamble, header, and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one or more embodiments, packet determination platform 103 causes a 1 MHz (32FFT) Long Training Field (LTF) sequence to be orthogonal to each half of a 2 MHz (64FFT) LTF sequence to allow 1 MHz vs. 2 MHz mode classification. The problem with some proposed sequences is that the cross-correlation with the 2 MHz sequence is not zero. The packet determination platform 103, however, causes a block-by-block differentially orthogonal 1 MHz LTF sequence design that provides complete orthogonality with 2, 4, 8 MHz LTF's while meeting other design requirements such as a low power architecture platform reference (PAPR). It can be easily shown that if a wireless channel is flat over each block, then the block-wise orthogonality is preserved through an operation BDD, illustrated below. Therefore, the block-wise orthogonality is expected to outperform orthogonality over current alternative solutions to solve the above problems in 802.11ah (e.g. enabling 1 MHz communications to coexist with 2, 4 and 16 MHz communications).

For example, the packet determination platform 103 may determine a type of packet communicated between any of the UE 101's and/or the transmitters 107 to be associated with a particular bandwidth based on the preamble of a sequence by conducting a series of calculations that distinguish a first bandwidth from a second bandwidth. For example, a first bandwidth may be a 1 MHz bandwidth while a second bandwidth may be any other bandwidth such as a 2 MHz bandwidth or any value greater than the first bandwidth. Accordingly, the packet determination platform 103 considers a transmitted binary preamble sequence P. The transmitted binary preamble sequence P has a corresponding received preamble R which is the transmitted binary preamble sequence P after being passed through a channel H, and undergoing a N-point FFT operation. The packet determination platform 103, in some embodiments, has a frequency domain differential detector defined as:

$$DD(R, P) = \sum_{k=1}^{N-1} (r_k r_{k+1}^*) \cdot (p_k p_{k+1}^*)^*$$

$$= \sum_{k=1}^{N-1} [(p_k h_k + n_k)(p_{k+1}^* h_{k+1}^* + n_{k+1}^*)] \cdot (p_k p_{k+1}^*)^*$$

$$\approx \sum_{k=1}^{N-1} h_k h_{k+1}^*$$

-continued $$\approx \sum_{k=1}^{N-1} |h_k|^2$$

For a binary sequence, $p_k p_{k+1}^* = \pm 1$.

For this example, DD(R,P) indicates if symbol R includes sequence P, allowing classification of the transmitted preamble P from another preamble sequence, by examining:

$$\underset{P}{\mathrm{argmax}}\{DD(R, P)\}$$

While this example illustrates a block-by-block differential detector in which a sequence of length N is divided into two blocks of size $A_1$ and $A_2$, the block-by-block differential detector could divide the sequence having a length N into any number of blocks such as, for example, $A_1, A_2, \ldots, A_L$ as a generalization. In some embodiments, the blocks may be of equal length, in other embodiments, the blocks may be of unequal predetermined or randomized lengths.

In this example, the detection metric to determine what type of bandwidth the preamble is associated with is the sum of BDD(R, P)=$\Sigma_l$ DD($R_l, A_l$) over the blocks $A_1, A_2$ and their corresponding received blocks $R_1, R_2$.

In the above example classification problem, the transmitted preamble P is distinguished from another preamble Q (for example a preamble associated with any other bandwidth) if it maximizes the new block-wise metric:

$$\underset{P}{\mathrm{argmax}}\{BDD(R, P)\}$$

assuming that $$\sum_{k_l} (p_k p_{k+1}^*) \cdot (q_k q_{k+1}^*)^* = 0$$

If the 1 MHz preamble is transmitted, and if the received sequence maximizes with the 1 MHz preamble, the maximization indicates that a preamble is associated with a 1 MHz band, and if not, then the preamble is associated with another band such as a 2 MHz band.

In embodiments, an example sequence (reading from left to right) may be designed as follows:

The sequence is 32 in length: 3 zeros (guard tones), 13 arbitrary valued, 1 zero (for DC subcarrier), 13 arbitrary valued, 2 zeros (guard tones).

Frequency Domain OFDM Symbol Structure:
 The 3 left most subcarriers are nulled (sub-carriers 0-2).
 Block $A_1$: This block consists of 13 subcarriers 3-15 containing frequency domain signals $a_{0,1}, a_{1,1}, \ldots, a_{11,1}, a_{12,1}$, respectively.
 Block $A_2$ is followed by DC subcarrier (subcarriers 16).
 Block $A_1$: This block consists of 13 subcarriers 17-31 containing frequency domain signals $a_{0,2}, a_{1,2}, \ldots, a_{11,2}, a_{12,2}$, respectively.
 The 2 rightmost subcarriers are nulled.

In embodiments, the A blocks may be constructed as blocks $A_1$ and $A_2$ of length 13 that are populated by the packet determination platform 103 using a computer search program that chooses a value from $\{-1, 1\}$. In some embodiments, the PAPR of the overall sequence may be controlled to be less than 3.9 dB (compared to a conventional sequence's 3.7 dB, and much lower than conventional 64, 128, and 256 FFT sequences having PAPR's of 4.8, 7, and 5.2 dB respectively). In one or more embodiments, the packet determination platform may cause the preamble sequences to be randomized by not allowing more than five consecutive values to be either 1 or −1. In one or more further embodiments, the packet determination platform 103 maximizes the speed of an autocorrelation drop after a Short Training Field (STF).

By conducting the above block-by-block differential detection that maintains orthogonality, the packet determination platform 103 is minimizes any re-work for 2, 4 and 8 MHz transmissions because the transmissions may coexist with 1 MHz transmissions. Additionally, scanning double hypotheses P and Q (or even more hypotheses, for example) does not increase the number of multiplications (only additions) because $r_k r_{k+1} = \pm 1$ is calculated once.

Figure 2:
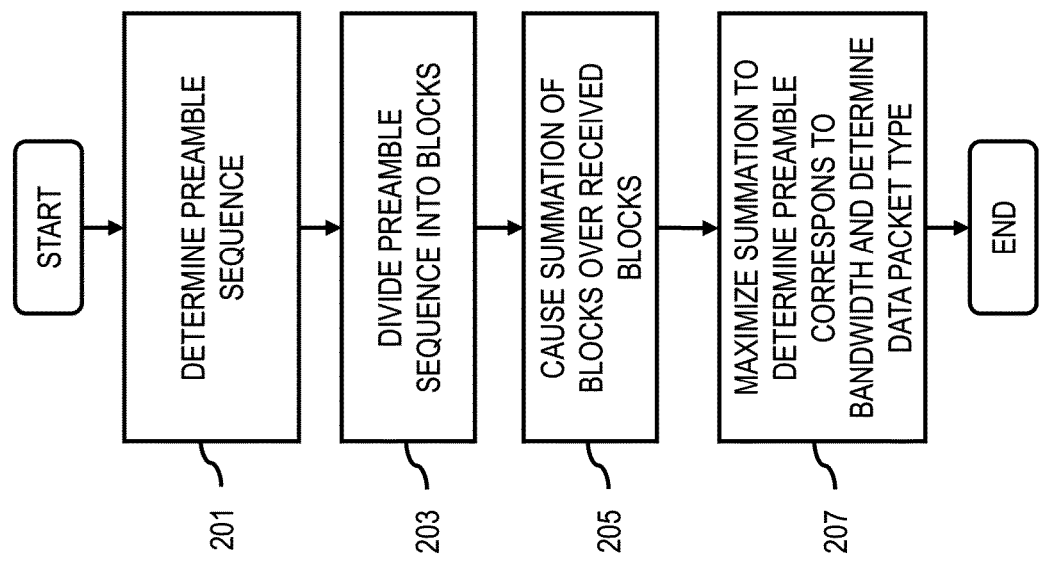
FIG. 2 is a flowchart of a process for determining a packet type based on a preamble portion of the packet while achieving orthogonality among various sequences of the packet, according to one embodiment.
Figure 3:
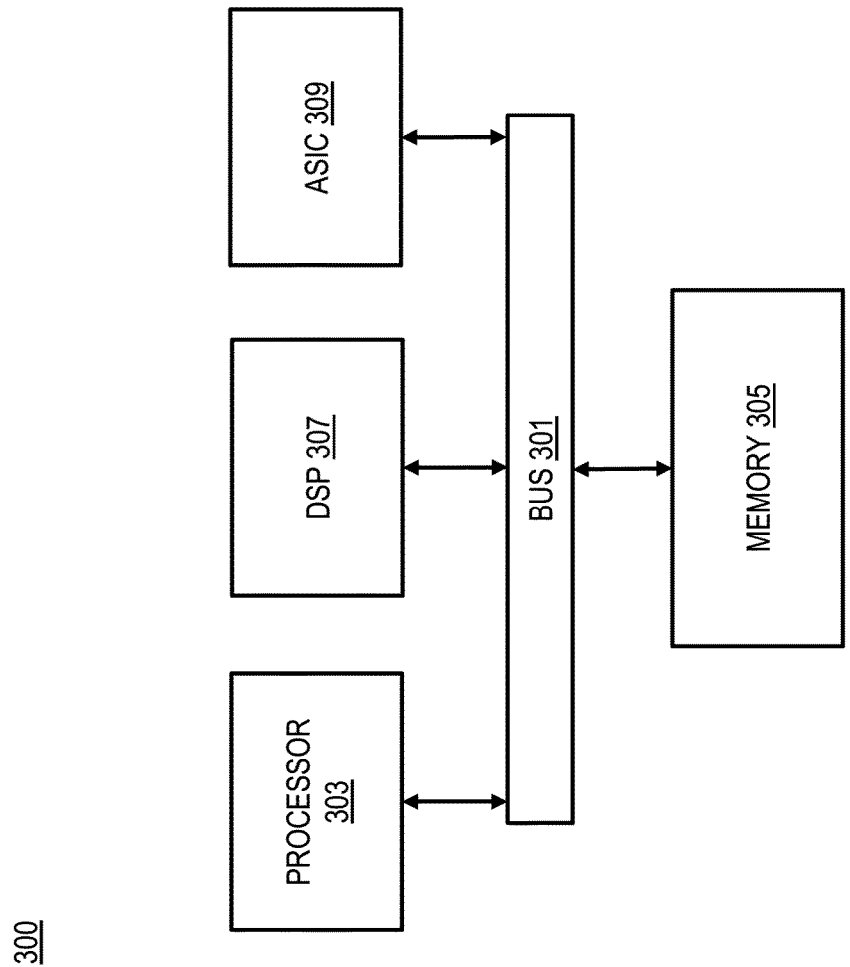
FIG. 3 is a diagram of a chip set that can be used to implement an embodiment.

FIG. 2 is a flowchart of a process for determining a packet type based on a preamble portion of the packet while achieving orthogonality among various sequences of the packet, according to one embodiment. In one embodiment, the packet determination platform 103 performs the process 200 and is implemented in, for instance, a chip set including a processor and a memory as shown in FIG. 3. In step 201, the packet determination platform 103 determines a preamble sequence of a packet of N-length and determines its length. Then, in step 203, the packet determination platform 103 causes, at least in part, the preamble sequence to be divided into a predetermined number of blocks. The division of the blocks in some embodiments is a sufficient number that causes, at least in part, a preamble sequence that corresponds to the first bandwidth to be orthogonal with a preamble sequence that corresponds to the second bandwidth. As discussed above, the number of blocks may be any number of equal or unequal lengths. The above discussed example, however, indicates two blocks. In one or more embodiments, the predetermined number of blocks may be populated using a search program configured to populate the predetermined blocks with any combination of +1's and −1's. In some embodiments, the population of the predetermined number of blocks may be randomized by causing, at least in part, the search program to limit the populated values to a maximum of five consecutive equal values.

The process continues to step 205 in which the packet determination platform 103 causes, at least in part, a mathematical operation and a summation over the predetermined number of blocks and the corresponding number of received blocks. In some embodiments, each of the predetermined number of blocks comprises a number of subcarriers, and a predetermined number of the subcarriers are caused to be nulled so as to generate a series of guard tones in the summation.

Then, in step 207, the packet determination platform 103 causes, at least in part, the summation to be maximized to determine the preamble sequence corresponds to one of a first bandwidth or a second bandwidth, the second bandwidth being greater than the first bandwidth, to determine a type of the packet. As discussed above, if the summation maximizes, the preamble corresponds to the first bandwidth, and if not, then the preamble corresponds to the second bandwidth. For example, the first bandwidth may be 1 MHz and the second bandwidth may be 2 MHz, or any other bandwidth such as, but not limited to, 4 MHz, 8 MHz, or 16 MHz. As discussed above, the packet determination platform 103 causes, in some embodiments, a PAPR associated with determining the type of the packet to be less than 3.9 dB and may cause the speed of an autocorrelation drop after a STF to be maximized.

The processes described herein for determining a packet type based on a preamble portion of the packet while achieving orthogonality among various sequences of the packet may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 3 illustrates a chip set or chip 300 upon which an embodiment may be implemented. Chip set 300 is programmed to determine a packet type based on a preamble portion of the packet while achieving orthogonality among various sequences of the packet as described herein may include, for example, bus 301, processor 303, memory 305, DSP 307 and ASIC 309 components.

The processor 303 and memory 305 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 300 can be implemented in a single chip. It is further contemplated that in certain embodiments the chip set or chip 300 can be implemented as a single "system on a chip." It is further contemplated that in certain embodiments a separate ASIC would not be used, for example, and that all relevant functions as disclosed herein would be performed by a processor or processors. Chip set or chip 300, or a portion thereof, constitutes a means for performing one or more steps of determining a packet type based on a preamble portion of the packet while achieving orthogonality among various sequences of the packet.

In one or more embodiments, the chip set or chip 300 includes a communication mechanism such as bus 301 for passing information among the components of the chip set 300. Processor 303 has connectivity to the bus 301 to execute instructions and process information stored in, for example, a memory 305. The processor 303 may include one or more processing cores with each core configured to perform independently. A multi-core processor enables multiprocessing within a single physical package. Examples of a multi-core processor include two, four, eight, or greater numbers of processing cores. Alternatively or in addition, the processor 303 may include one or more microprocessors configured in tandem via the bus 301 to enable independent execution of instructions, pipelining, and multithreading. The processor 303 may also be accompanied with one or more specialized components to perform certain processing functions and tasks such as one or more digital signal processors (DSP) 307, or one or more application-specific integrated circuits (ASIC) 309. A DSP 307 typically is configured to process real-world signals (e.g., sound) in real time independently of the processor 303. Similarly, an ASIC 309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 303 performs a set of operations on information as specified by computer program code related to determining a packet type based on a preamble portion of the packet while achieving orthogonality among various sequences of the packet. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 301 and placing information on the bus 301. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 303, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 303 and accompanying components have connectivity to the memory 305 via the bus 301. The memory 305 may include one or more of dynamic memory (e.g., RAM, magnetic disk, writable optical disk, etc.) and static memory (e.g., ROM, CD-ROM, etc.) for storing executable instructions that when executed perform the inventive steps described herein to determine a packet type based on a preamble portion of the packet while achieving orthogonality among various sequences of the packet. The memory 305 also stores the data associated with or generated by the execution of the inventive steps.

In one or more embodiments, the memory 305, such as a random access memory (RAM) or any other dynamic storage device, stores information including processor instructions for determining a packet type based on a preamble portion of the packet while achieving orthogonality among various sequences of the packet. Dynamic memory allows information stored therein to be changed by system 100. RAM allows a unit of information stored at a location called a memory address to be stored and retrieved independently of information at neighboring addresses. The memory 305 is also used by the processor 303 to store temporary values during execution of processor instructions. The memory 305 may also be a read only memory (ROM) or any other static storage device coupled to the bus 301 for storing static information, including instructions, that is not changed by the system 100. Some memory is composed of volatile storage that loses the information stored thereon when power is lost. The memory 305 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 303, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the disclosure is not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:

1. A method comprising:
    determining a preamble sequence of a packet, the preamble sequence having a determinable length;
    causing, at least in part, the preamble sequence to be divided into a predetermined number of blocks;
    causing, at least in part, a mathematical operation and a summation over the predetermined number of blocks and a corresponding number of received blocks; and
    causing, at least in part, the summation to be maximized to classify the preamble sequence as to one of a first bandwidth or as one of a second bandwidth, the second bandwidth being greater than the first bandwidth, to determine a type of the packet, wherein the classification of the preamble sequence is based, at least in part, on an equation $$\sum_{k_i} (p|_k \ p^*_{k+1}|_{l+1}), (q_k q^*_{k+1})^* = 0,$$

where p is the preamble sequence, q is a preamble sequence that corresponds to the first bandwidth or the second bandwidth, and k is the index of summation and wherein k is an integer;
    wherein the predetermined number of blocks are of equal length;
    wherein each of the predetermined number of blocks comprises a number of subcarriers, and a predetermined number of the subcarriers are caused to be nulled so as to generate guard tones;
    wherein the division of the blocks causes, at least in part, a preamble sequence that corresponds to the first bandwidth to be orthogonal with a preamble sequence that corresponds to the second bandwidth where each block is in a differential sense orthogonal.

2. A method of claim 1, wherein the predetermined number of blocks comprises two or more blocks.

3. A method of claim 1, further comprising:
causing, at least in part, the predetermined number of blocks to be populated using a search program configured to populate the predetermined blocks with any combination of +1's and −1's.

4. A method of claim 3, further comprising:
causing, at least in part, the population of the predetermined number of blocks to be randomized by causing, at least in part, the search program to limit the populated values to a maximum of five consecutive equal values.

5. A method of claim 3, further comprising:
causing, at least in part, a power architecture performance reference associated with determining the type of the data packet to be less than 3.9 dB.

6. A method of claim 3, further comprising:
causing, at least in part, a speed of an autocorrelation drop after a short training field to be maximized.

7. A method of claim 1, wherein the first bandwidth is equal to 1 MHz.

8. A method of claim 1, further comprising:
causing, at least in part, the packet to be received from a transmitting source.

9. A method of claim 1, further comprising:
causing, at least in part, the packet to be transmitted from a transmitting source to a receiver.

10. An apparatus comprising:
at least one processor; and
at least one memory including computer program code for one or more programs,
the at least one memory and the computer program code configured to, with the at least one processor, cause the apparatus to perform at least the following:
determine a preamble sequence of a packet, the preamble sequence having a determinable length;
cause, at least in part, the preamble sequence to be divided into a predetermined number of blocks;
cause, at least in part, a mathematical operation and a summation over the predetermined number of blocks and a corresponding number of received blocks; and
cause, at least in part, the summation to be maximized to classify the preamble sequence corresponds to one of a first bandwidth or a second bandwidth, the second bandwidth being greater than the first bandwidth, to determine a type of the packet, wherein the classification of the preamble sequence is based, at least in part, on an equation $$\sum_{k_i}(p_k \; p^*_{k+1}|^{|-|}),(q_k q^*_{k+1})^* = 0,$$

where p is the preamble sequence, q is a preamble sequence that corresponds to the first bandwidth or the second bandwidth, and k is the index of summation and wherein k is an integer;
wherein the predetermined number of blocks are of equal length;
wherein each of the predetermined number of blocks comprises a number of subcarriers, and a predetermined number of the subcarriers are caused to be nulled so as to generate guard tones;
wherein the division of the blocks causes, at least in part, a preamble sequence that corresponds to the first bandwidth to be orthogonal with a preamble sequence that corresponds to the second bandwidth where each block is in a differential sense orthogonal.

11. An apparatus of claim 10, wherein the predetermined number of blocks comprises two or more blocks.

12. An apparatus of claim 10, wherein the apparatus is further caused to:
cause, at least in part, the predetermined number of blocks to be populated using a search program configured to populate the predetermined blocks with any combination of +1's and −1's.

13. An apparatus of claim 12, wherein the apparatus is further caused to:
cause, at least in part, the population of the predetermined number of blocks to be randomized by causing, at least in part, the search program to limit the populated values to a maximum of five consecutive equal values.

14. An apparatus of claim 12, wherein the apparatus is further caused to:
cause, at least in part, a power architecture performance reference associated with determining the type of the data packet to be less than 3.9 dB.

15. An apparatus of claim 12, wherein the apparatus is further caused to:
cause, at least in part, a speed of an autocorrelation drop after a short training field to be maximized.

16. An apparatus of claim 10, wherein the first bandwidth is equal to 1 MHz.

17. An apparatus of claim 10, further comprising a transceiver, wherein the apparatus is further caused to cause, at least in part, the packet to be received from a transmitting source.

18. An apparatus of claim 10, further comprising a transceiver, wherein the apparatus is further caused to cause, at least in part, the packet to be transmitted from a transmitting source to a receiver.

19. A method comprising:
determining a preamble sequence of a packet, the preamble sequence having a determinable length; and
causing, at least in part, the preamble sequence to be divided into a predetermined number of blocks,
wherein the division of the blocks causes, at least in part, a preamble sequence that corresponds to a first bandwidth to be orthogonal with a preamble sequence that corresponds to a second bandwidth where each of the blocks is in a differential sense orthogonal;
wherein the orthogonality of each of the blocks is based, at least in part, on an equation $$\sum_{k_i}(p_k \; p^*_{k+1}|^{|-|}),(q_k q^*_{k+1})^* = 0,$$

where p is the preamble sequence that corresponds to a first bandwidth, q is the preamble sequence that corresponds to a second bandwidth, and k is the index of summation and wherein k is an integer.

20. A non-transitory computer-readable storage medium carrying one or more sequences of one or more instructions which, when executed by one or more processors, cause an apparatus to at least perform the following:
determine a preamble sequence of a packet, the preamble sequence having a determinable length;
cause, at least in part, the preamble sequence to be divided into a predetermined number of blocks;
cause, at least in part, a mathematical operation and a summation over the predetermined number of blocks and a corresponding number of received blocks; and cause, at least in part, the summation to be maximized to determine the preamble sequence corresponds to one of a first bandwidth or a second bandwidth, the second bandwidth being greater than the first bandwidth, to determine a type of the packet;

wherein the division of the blocks causes, at least in part, a preamble sequence that corresponds to the first bandwidth to be orthogonal with a preamble sequence that corresponds to the second bandwidth where each block is in a differential sense orthogonal;

wherein the orthogonality of each of the blocks is based, at least in part, on an equation $$\sum_{k_i} (p_k \ p_{k+1}^*), (q_k q_{k+1}^*)^* = 0,$$

where p is the preamble sequence that corresponds to a first bandwidth, q is the preamble sequence that corresponds to a second bandwidth, and k is the index of summation and wherein k is an integer.

* * * * *